United States Patent [19]

Betensky

[11] 4,299,454
[45] Nov. 10, 1981

[54] WIDE ANGLE TO LONG FOCUS ZOOM LENS

[75] Inventor: Ellis Betensky, Tel Aviv, Israel

[73] Assignee: Vivitar Corporation, San Francisco, Calif.

[21] Appl. No.: 70,749

[22] Filed: Sep. 5, 1979

Related U.S. Application Data

[63] Continuation-in-part of Ser. No. 941,430, Sep. 11, 1978, abandoned.

[51] Int. Cl.³ .............................................. G02B 15/18
[52] U.S. Cl. ..................................... 350/427; 350/450
[58] Field of Search .............. 350/184, 186, 176, 177, 350/206, 209, 427, 450

[56] References Cited

U.S. PATENT DOCUMENTS

| | | | |
|---|---|---|---|
| 3,549,242 | 12/1970 | Higuchi et al. | 350/184 |
| 3,615,125 | 10/1971 | Higuchi et al. | 350/427 |
| 3,884,555 | 5/1975 | Suwa et al. | 350/184 X |
| 3,918,797 | 11/1975 | Takano | 350/186 |
| 3,918,798 | 11/1975 | Takano | 350/186 |
| 3,937,562 | 2/1976 | Muszumanski | 350/184 |
| 3,961,845 | 6/1976 | Doi et al. | 350/184 |
| 4,017,161 | 4/1977 | Tsuji | 350/184 |
| 4,141,636 | 2/1979 | Shimojima | 350/187 X |
| 4,192,577 | 3/1980 | Ogino | 350/184 |

FOREIGN PATENT DOCUMENTS

| | | |
|---|---|---|
| 1253477 | 11/1967 | Fed. Rep. of Germany . |
| 51-26276 | 8/1976 | Japan . |
| 1241135 | 7/1971 | United Kingdom . |

Primary Examiner—John K. Corbin
Assistant Examiner—Scott J. Sugarman
Attorney, Agent, or Firm—DeLio and Montgomery

[57] ABSTRACT

A zoom lens of the type having equivalent focal lengths varying from substantially less than the diagonal of its image frame to an equivalent focal length at least twice the diagonal of the image frame and having a short front vertex distance. The zoom range may be as great as 5:1, with a field angle in excess of 70 degrees at the widest field position.

35 Claims, 10 Drawing Figures

WIDE ANGLE TO LONG FOCUS ZOOM LENS

This application is a continuation-in-part of application Ser. No. 941,430, filed Sept. 11, 1978, now abandoned.

This invention relates to zoom lenses and more particularly relates to a zoom lens having a short front vertex distance FVD in relation to focal length, and a focal length range as great as 5:1, with an angular coverage field in excess of 70 degrees at its lower equivalent focal length (EFL).

In recent years, zoom lenses which have lower EFL's in the wide angle range have been developed which have focal length variations of about 3:1 or less, and a field of view in excess of 70 degrees. However, known lens often have excessive spherical aberration at the long focal length position as the zoom range is extended. Thus, the field of view of such lenses is restricted on the longer field length of the range to an angle which is greater than 20 degrees. While these known design types can be modified to cover greater focal length ranges, the resulting designs for well corrected lenses are undesirably large in diameter and in length.

An optical system according to the present invention overcomes many of the above-mentioned problems while providing good aberration correction for a zoom range as great as 5:1, and an angular coverage at the widest angle condition in excess of 70 degrees. A lens embodying the invention comprises either three or four basic groups. The aperture defining diaphragm is located near the middle of the lens assembly so as to enable the lens to be of minimum size. In the four-group system, a first positive group moves axially for focusing and the other three groups move for zooming. The diaphragm may move with the movable components, may be fixed causing the relative aperture to vary, or the opening of the diaphragm may be varied with EFL to maintain a constant relative aperature. In the three group embodiment the second group is of negative optical power and the third group is of positive power. In the four-group embodiment, the second group is of negative opticl power and the third and fourth groups are of positive power.

A wide angle lens may be defined as one whose EFL is shorter than the diagonal of the image frame of the lens. When designing a very wide angle to long focus zoom lens, difficulty resides in obtaining sufficient optical power of the individual lens groups to achieve a reasonably small overall length and diameter. If the optical powers of the lens groups are allowed to be small, then the dimensions of the lens necessarily becomes large, but the aberration corrections are not difficult to correct. However, if the optical power of the lens groups become strong, the aberrations become correspondingly more difficult to correct.

In lenses embodying this invention, the optical power of the second group is considerably larger than previously known zoom lenses, and the overall form of the lens is designed to obtain the necessary aberration corrections.

The invention selects the first focusing group to be of a given positive power. This first group has sufficient power to reduce the diameter of the axial beam presented to the strong negative second group, but must have better aberration correction than would be provided by simpler forms. Hence, the second component group includes a rear positive doublet. Since the negative power of the second group is relatively large, some aberrations remain which vary as the focal length is adjusted. The third group is selected to reduce these aberrations and a fourth group may be added to form the final image and contribute to correction of aberrations. Alternatively, the fourth group may not be used in which case the third group is designed to finally correct aberrations and aid in maintaining the image of the focal plane.

Preferred forms of zoom lenses, with a focal length varying from a relatively wide field through "normal" to a long focus field, are designed to result in a relatively small overall length and a small diameter front element. These results enable a more compact configuration than would be expected for a lens having the same zoom ratio, the degree of optical corrections, and the large field of view. Generally, it is difficult to provide a lens with an EFL ranging from a wide angle field to an extended zoom range while maintaining compactness, and cost effectiveness. However, lenses embodying the invention accomplish such features.

An object of this invention is to provide a new and improved compact zoom objective lens with aberrations well corrected, and capable of angular coverage from a field wider than 70 degrees, while providing a large zoom ratio.

Another object of this invention is to provide a zoom lens which will subtend a field angle well below the diagonal of its image frame to a field substantially two to three times the diagonal of the image frame.

The features of the invention which are believed to be novel are particularly pointed out and distinctly claimed in the concluding portion of this specification. However, the invention both as to its organization and operation together with further objects and advantages thereof may best be appreciated by reference to the following detailed description taken in conjunction with the drawings, in which:

Figure 1:
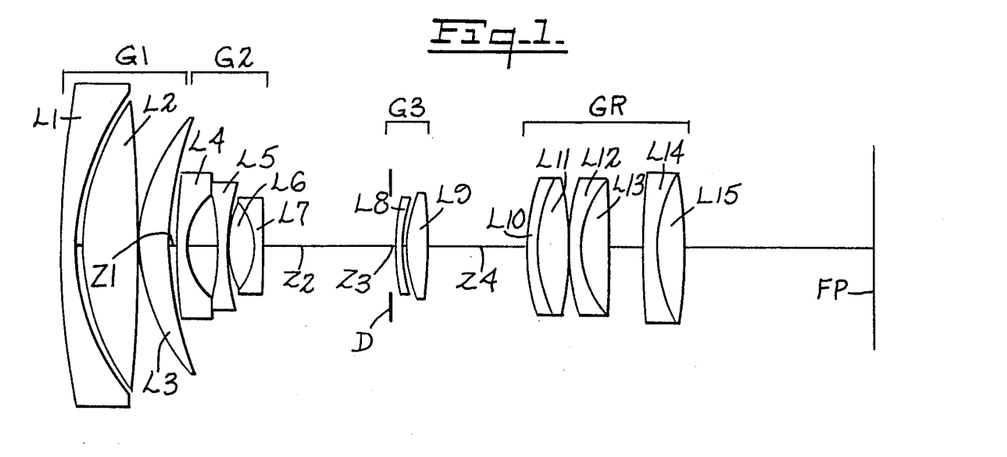
FIGS. 1, 2, 3, 4 and 5 are side illustrations of lenses embodying the invention with the optical groups thereof positioned for the shorter EFL of the lens.
Figure 1A:
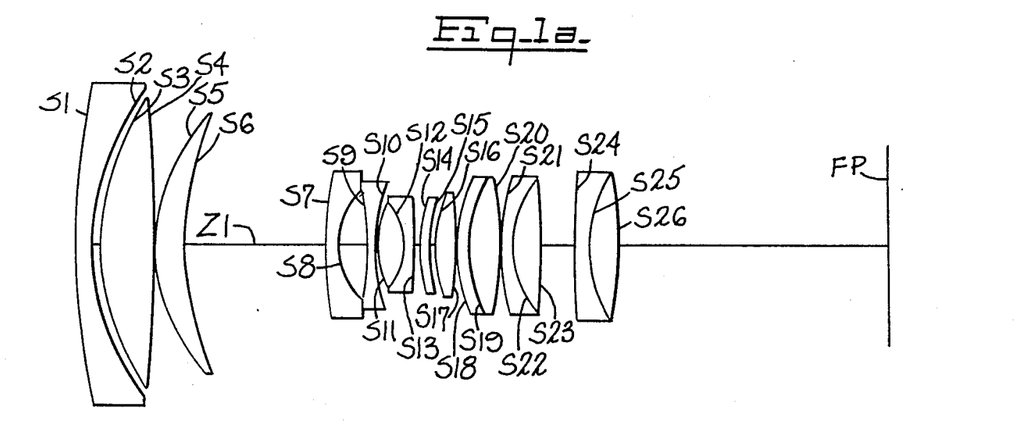
FIGS. 1a, 2a, 3a, 4a, and 5a are side elevations of the lenses of FIGS. 1-5, respectively, with the optical groups positioned for the longer EFL of the lens.

Referring to FIGS. 1 and 1a, a compact variable focal length or zoom lens of four groups is shown. The embodiment of FIGS. 1 and 1a represents a lens of approximately 5:1 zoom ration. In these lenses, primarily intended for use on a camera of the 35 mm format, the angular coverage extends from wide angle through "normal" to moderate telephoto.

In the drawings, the reference L followed by an arabic numeral designates lens progressively from the object end to the image end of the lens. The reference S followed by an arabic numeral designates lens surfaces progressively from the object to the image end of the lens. The various lens groups are designated by the reference G followed by an arabic numeral progressively from the object to image end of the lens. The axial spaces which vary with change in EFL are designated by the reference Z. The reference D represents the aperture defining mechanism, and FP indicates the film of focal plane. In the following description, the various groups G include the elements l as shown in Table I.

TABLE I

|  | G1 | G2 | G3 | GR |
|---|---|---|---|---|
| TABLE II | L1,L2,L3 | L4-L7 | L8,L9 | L10-L15 |
| TABLE IV | L1,L2,L3 | L4-L7 | L8,L9 | L14-L15 |
| TABLE VI | L1,L2,L3 | L4-L7 | L8,L9 | L10-L13 |
| TABLE VIII | L1,L2,L3 | L4-L7 | L8,L9 | L10-L13 |
| TABLE X | L1,L2,L3 | L4-L7 | L8,L9 | L10-L14 |
| TABLE XII | L1,L2,L3 | L4-L7 |  | L8-L14 |

A four-group system, as exemplified in FIGS. 1 and 1a, includes a first positive group G1 which moves axially only for focusing. The axial positions of the remaining groups are varied as the focal length of the objective is changed. A diaphragm D is positioned between the second and third groups to enable the lens size to be kept to a minimum, or it may be fixed in axial position. If fixed in position, the relative aperture varies as the focal length is changed. However, a diaphragm adjustable as the focal length changes, can be incorporated to maintain the relative aperture constant as the lens is zoomed from one end of its EFL range toward the other end.

In the embodiment shown in FIGS. 1 and 1a, the first group is of positive power and comprises a negative meniscus element L1, a bi-convex element L2 and a positive meniscus element L3.

Air spaced from the first group is a second group G2 of negative power which is movable as the focal length of the lens is varied. This group comprises a negative meniscus element L4 convex to the object, followed by a negative bi-concave element L5, a bi-convex doublet of positive power comprising a bi-convex element L6, and a meniscus L7.

A third positive group G3 in the form of air-spaced doublet elements L8, L9 is arranged for movement relative to the second group. Element L8 is a thin negative meniscus element. Element L9 is a bi-convex element of positive power. This group moves with a reversing motion, as hereinafter set forth, as the focal length of the lens is varied. This third group provides aberration compensation.

The fourth or last group GR includes a plurality of doublets air spaced one from the other, but movable together during variation of the EFL of the lens. Elements L10, L12, and L14 are meniscus elements of negative power, which are mated respectively with bi-convex elements L11, L13, and L15 of positive power to provide three bi-convex lenses of positive power.

A lens embodying the invention may have a zoom ratio of essentially five to one. In a 24×36 mm image frame format (43.3 diagonal), examples are given of 25.5 mm to 125.00 mm EFL. However, the invention is equally applicable to providing well corrected lenses of smaller zoom ranges from an EFL substantially below the diagonal of the image frame (about 0.66) to an EFL of two or more times the diagonal of the image frame.

To achieve a lens which satisfies the objectives of the invention, certain parameters have been determined.

The second group G2 is of strong relative negative power to provide compactness of the overall lens, both as to length and diameter, but requires positive corrections in the form of the doublet L6, L7 (FIGS. 1 and 1a).

An important condition of the lens is the relation of combined power of the two negative elements of group G2 to the positive power component. It has been determined that:

$$|0.20 K_{21}| < K_{22} < |0.40 K_{21}|$$

where $K_{22}$ is the power of the positive component of G2, and
$K_{21}$ is the sum of the absolute power of the negative elements of Group G2.

Figure 5:
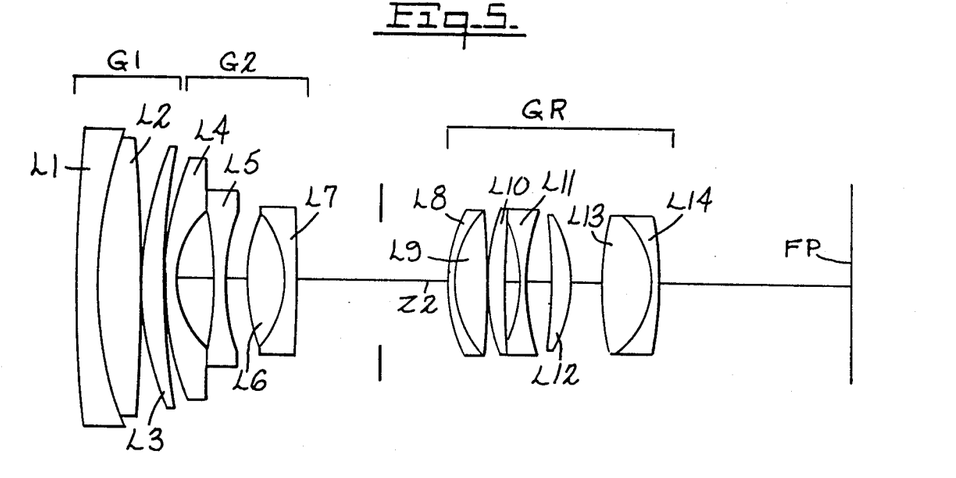
Figure 5A:
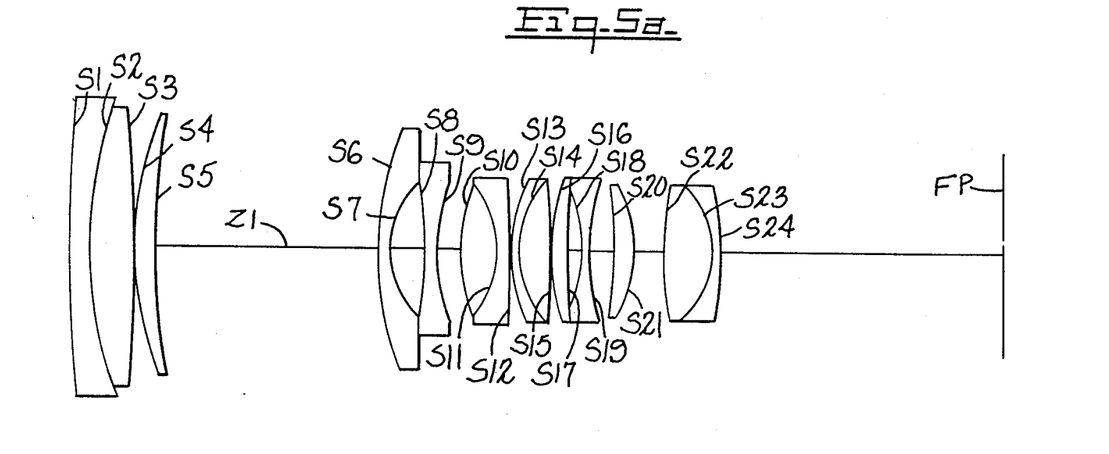

This is the most important parameter to maintain compactness. Other parameters determined during the design of lenses embodying the invention may best be expresed in terms of the geometric mean power of the lenses. The geometric mean power $K_M$ of a zoom lens is expressed as:

$$K_M = \sqrt{K_S \times K_L}$$

where $K_S$ is the power of the lens at its shorter EFL extreme, and
$K_L$ is the power of the lens at its longer EFL extreme. In Tables II, IV, VI, VII and X, $K_M$ is 0.0177, and in Table VI, $K_m$ is 0.0193. The power $K_1$ of the first Group G1 should be:

$$0.40 K_M < K_1 < 1.0 K_M$$

where the lens comprise three groups as exemplified in Tables XII and FIGS. 5 and 5a, and where the lens comprises four groups as shown in Tables II, IV, VI, VII and X.

$$0.70 K_M < K_1 < 1.0 K_M$$

Also, the power $K_3$ of the third group should be:

$$1.5 K_M > K_3 > 0.6 K_M$$

and the absolute power of the second negative group should be:

$$4.0 K_M > |K_2| > 2.0 K_M$$

Six examples of lenses embodying the foregoing parameters are set forth in the following tables and described in conjunction with the drawings.

In the following presciption tables, the index of refraction of each element is given as $N_D$, and the dispersion as measured by the Abbe number is given by $V_D$. Zoom spacings Z are given in odd numbered tables following each prescription table.

In the lens of FIGS. 1 and 1a, and Table I, group G1 moves axially only for focusing. As the EFL of the lens is varied from the lower limit to the upper limits, group G2 moves toward the image end, group G3 has reversing motion, and group GR moves toward the object end. The aperture defining mechanism is positioned just in front of group G3.

A lens embodying the invention as scaled to an image frame of 24×36 mm, and EFL's of 25.5 mm (76 degree field) to 122.70 degrees (18 degrees field) with relative aperture of f/3.0 to f/4.6 is substantially described in Table II.

TABLE II

| Lens | Surface | Radius of Curvature (mm) | Axial Distance Between Surfaces (mm) | Nd | Vd |
|---|---|---|---|---|---|
| L1 | S1 | 185.9987 |  |  |  |
|  |  |  | 3.000 | 1.847 | 23.8 |

TABLE II-continued

| Lens | Surface | Radius of Curvature (mm) | Axial Distance Between Surfaces (mm) | Nd | Vd |
|---|---|---|---|---|---|
|  | S2 | 49.6058 |  |  |  |
|  |  |  | 1.768 |  |  |
|  | S3 | 51.2413 |  |  |  |
| L2 |  |  | 11.700 | 1.743 | 49.2 |
|  | S4 | −323.9418 |  |  |  |
|  |  |  | .150 |  |  |
|  | S5 | 37.4951 |  |  |  |
| L3 |  |  | 6.000 | 1.806 | 40.7 |
|  | S6 | 70.1003 |  |  |  |
|  |  |  | Z1 |  |  |
|  | S7 | 118.442 |  |  |  |
| L4 |  |  | 2.000 | 1.850 | 32.2 |
|  | S8 | 13.2349 |  |  |  |
|  |  |  | 6.735 |  |  |
|  | S9 | −49.699 |  |  |  |
| L5 |  |  | 2.000 | 1.835 | 43.0 |
|  | S10 | 42.7192 |  |  |  |
|  |  |  | [Z2] .100 |  |  |
|  | S11 | 24.7201 |  |  |  |
| L6 |  |  | 7.641 | 1.689 | 31.2 |
|  | S12 | −13.4465 |  |  |  |
| L7 |  |  | 2.000 | 1.713 | 53.9 |
|  | S13 | −223.5334 |  |  |  |
|  |  |  | ]Z3] Z2 |  |  |
|  | Aperture |  |  |  |  |
|  |  |  | [Z4] Z3 |  |  |
|  | S14 | 47.1016 |  |  |  |
| L8 |  |  | 1.500 | 1.847 | 23.8 |
|  | S15 | 25.6722 |  |  |  |
|  |  |  | 1.409 |  |  |
|  | S16 | 31.4590 |  |  |  |
| L9 |  |  | 4.300 | 1.762 | 40.3 |
|  | S17 | −100.8025 |  |  |  |
|  |  |  | [.500] Z4 |  |  |
|  | S18 | 40.3475 |  |  |  |
| L10 |  |  | 2.000 | 1.847 | 23.8 |
|  | S19 | 25.3014 |  |  |  |
| L11 |  |  | 7.000 | 1.589 | 41.0 |
|  | S20 | −95.3470 |  |  |  |
|  |  |  | .150 |  |  |
|  | S21 | 59.5290 |  |  |  |
| L12 |  |  | 2.500 | 1.835 | 43.0 |
|  | S22 | 20.2397 |  |  |  |
| L13 |  |  | 6.100 | 1.488 | 70.4 |
|  | S23 | −564.7725 |  |  |  |
|  |  |  | 7.154 |  |  |
|  | S24 | 220.4092 |  |  |  |
| L14 |  |  | 2.500 | 1.850 | 32.2 |
|  | S25 | 28.9627 |  |  |  |
| L15 |  |  | 6.100 | 1.488 | 70.4 |
|  | S26 | −83.7917 |  |  |  |

The spacing of the various groups of FIGS. 1 and 1a and Table II during zooming are set forth below in Table III:

TABLE III

| EFL | Z1 | Z2 | Z3 | Z4 | f/No. |
|---|---|---|---|---|---|
| 25.5mm | 1.20mm | 20.61mm | 6.71mm | 19.73mm | 3.30 |
| 40.0 | 7.76 | 16.97 | .50 | 10.93 | 4.35 |
| 85.0 | 25.12 | 4.38 | 4.88 | .50 | 4.10 |
| 125.0 | 29.66 | 1.70 | .50 | .50 | 4.60 |

The space Z3 is the spacing between surface S16 and the diaphragm D.

Another embodiment of the invention has the elemental configuration shown in FIGS. 1 and 1a.

Here the aperture defining diaphragm is located after group G2 and axially fixed. This lens, scaled to a 24×36 mm image frame, and has an EFL range of 25.5 to 125 mm and subtends semi-fields of 9.1 degrees to 38 degrees is substantially described in Table IV.

TABLE IV

| Lens | Surface | Radius of Curvature (mm) | Axial Distance Between Surfaces (mm) | Nd | Vd |
|---|---|---|---|---|---|
|  | S1 | 414.835 |  |  |  |
| L1 |  |  | 3.500 | 1.847 | 23.8 |
|  | S2 | 50.369 |  |  |  |
|  |  |  | 1.768 |  |  |
|  | S3 | 52.721 |  |  |  |
| L2 |  |  | 11.700 | 1.743 | 49.2 |
|  | S4 | −203.797 |  |  |  |
|  |  |  | .150 |  |  |
|  | S5 | 41.688 |  |  |  |
| L3 |  |  | 6.00 | 1.806 | 40.7 |
|  | S6 | 103.130 |  |  |  |
|  |  |  | Z1 |  |  |
|  | S7 | 302.316 |  |  |  |
| L4 |  |  | 2.00 | 1.850 | 32.2 |
|  | S8 | 14.793 |  |  |  |
|  |  |  | 8.400 |  |  |
|  | S9 | −64.865 |  |  |  |
| L5 |  |  | 2.000 | 1.840 | 42.8 |
|  | S10 | 44.117 |  |  |  |
|  |  |  | .100 |  |  |
|  | S11 | 28.093 |  |  |  |
| L6 |  |  | 7.700 | 1.739 | 28.3 |
|  | S12 | −19.503 |  |  |  |
| L7 |  |  | 2.000 | 1.651 | 59.0 |
|  | S13 | 349.480 |  |  |  |
|  |  |  | Z2 |  |  |
|  | Aperture |  |  |  |  |
|  |  |  | Z3 |  |  |
|  | S14 | 42.981 |  |  |  |
| L8 |  |  | 1.200 | 1.847 | 23.8 |
|  | S15 | 26.354 |  |  |  |
|  |  |  | 1.858 |  |  |
|  | S16 | 31.399 |  |  |  |
| L9 |  |  | 3.300 | 1.790 | 41.4 |
|  | S17 | −199.096 |  |  |  |
|  |  |  | Z4 |  |  |
|  | S18 | 28.676 |  |  |  |
| L10 |  |  | 2.000 | 1.862 | 23.3 |
|  | S19 | 20.560 |  |  |  |
| L11 |  |  | 4.500 | 1.547 | 27.8 |
|  | S20 | −128.190 |  |  |  |
|  |  |  | 8.039 |  |  |
|  | S21 | 70.468 |  |  |  |
| L12 |  |  | 2.500 | 1.619 | 20.3 |
|  | S22 | 25.194 |  |  |  |
| L13 |  |  | 6.100 | 1.488 | 70.3 |
|  | S23 | −132.809 |  |  |  |
|  |  |  | 1.984 |  |  |
|  | S24 | 2798.444 |  |  |  |
| L14 |  |  | 2.500 | 1.863 | 37.4 |
|  | S25 | 21.735 |  |  |  |
| L15 |  |  | 6.100 | 1.482 | 71.2 |
|  | S26 | −70.988 |  |  |  |

The spacing of the various groups of Table IV during zooming as set forth below in Table V.

TABLE V

| EFL | Z1 | Z2 | Z3 | Z4 | F/No. |
|---|---|---|---|---|---|
| 25.5mm | 1.21mm | 29.85mm | 3.63mm | 13.92mm | 3.30 |
| 40.0 | 8.70 | 22.03 | .50 | 6.60 | 3.90 |
| 85.0 | 26.4 | 4.89 | 6.98 | .03 | 3.44 |
| 125.0 | 29.6 | 1.700 | .50 | .50 | 4.30 |

Figure 2:
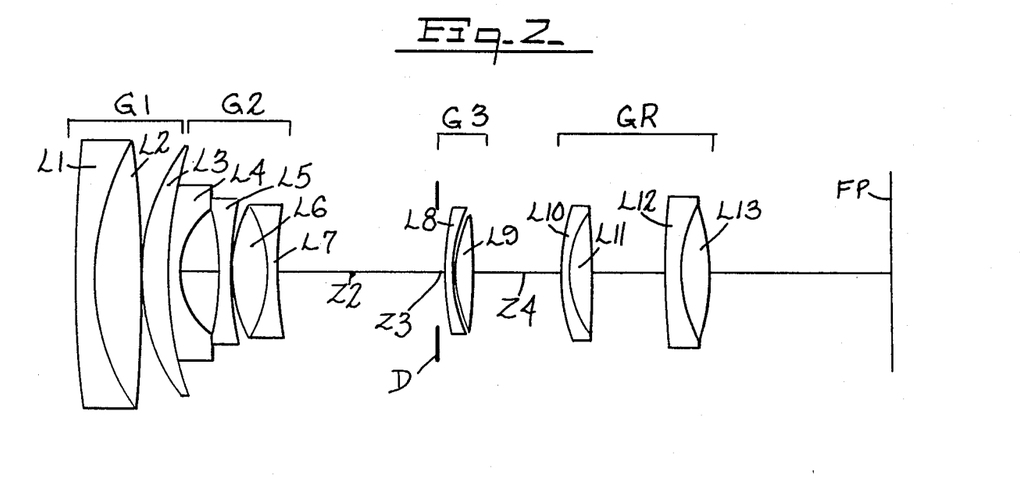
Figure 2A:
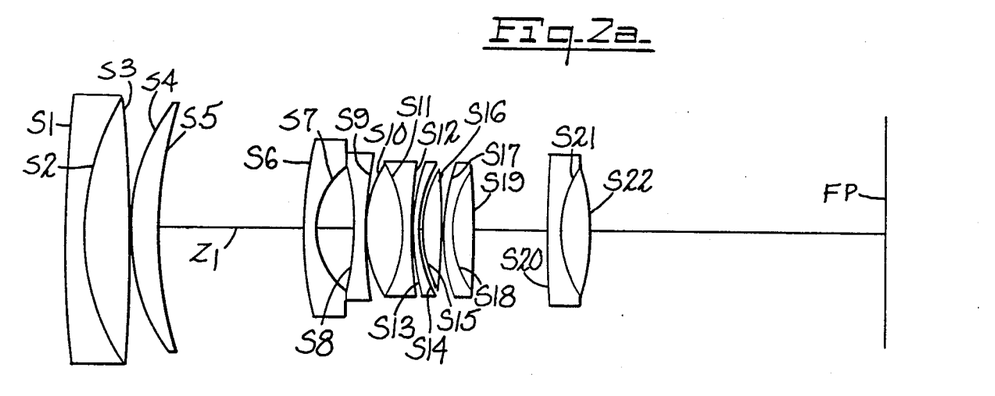

A third embodiment of the invention is shown in FIGS. 2 and 2a, and has a movable aperture defining mechanism between groups G2 and G3.

The front group G comprises a positive cemented doublet L1, L2, and a positive meniscus L3 convex to the object. Groups G2 and G3 have the same configurations previously described. Group GR comprises a first positive doublet L10 and L11, and a second positive doublet L12 and L3.

As the EFL varies from the lower limit to the upper limit group G2 moves toward the image end. Group G3 moves first toward the aperture, then reverses and then back toward the aperture.

This lens is scaled to an image frame of 24×36 mm, having EFL's of 25.5 mm to 125 mm and subtending semi-angles of 9 degrees to 76 degrees is substantially described in Table VI.

TABLE VI

| Lens | Surface | Radius Curvature (mm) | Axial Distance Between Surfaces (mm) | Nd | Vd |
|---|---|---|---|---|---|
| L1 | S1 | 272.365 | | | |
| | | | 3.50 | 1.762 | 27.3 |
| | S2 | 49.902 | | | |
| L2 | | | 9.70 | 1.673 | 51.4 |
| | S3 | −348.735 | | | |
| | | | .15 | | |
| | S4 | 41.575 | | | |
| L3 | | | 6.00 | 1.806 | 40.7 |
| | S5 | 88.688 | | | |
| | | | Z1 | | |
| | S6 | 119.038 | | | |
| L4 | | | 2.00 | 1.857 | 32.0 |
| | S7 | 15.309 | | | |
| | | | 8.40 | | |
| | S8 | −59.323 | | | |
| L5 | | | 2.00 | 1.840 | 42.8 |
| | S9 | 85.381 | | | |
| | | | .07 | | |
| | S10 | 31.319 | | | |
| L6 | | | 7.70 | 1.762 | 27.3 |
| | S11 | −25.034 | | | |
| L7 | | | 2.00 | 1.697 | 55.5 |
| | S12 | 110.053 | | | |
| | | | Z2 | | |
| Aperture | | | | | |
| | | | Z3 | | |
| | S13 | 54.083 | | | |
| L8 | | | 1.20 | 1.847 | 23.8 |
| | S14 | 27.576 | | | |
| | | | .43 | | |
| | S15 | 29.890 | | | |
| L9 | | | 3.30 | 1.806 | 40.7 |
| | S16 | −163.620 | | | |
| | | | Z4 | | |
| | S17 | 47.088 | | | |
| L10 | | | 2.00 | 1.847 | 23.8 |
| | S18 | 20.204 | | | |
| L11 | | | 4.50 | 1.650 | 39.3 |
| | S19 | −192.570 | | | |
| | | | 14.66 | | |
| | S20 | 253.894 | | | |
| L12 | | | 2.49 | 1.790 | 43.7 |
| | S21 | 25.299 | | | |
| L13 | | | 6.10 | 1.488 | 70.4 |
| | S22 | −47.350 | | | |

The spacing of the various groups is set forth below in Table VII.

TABLE VII

| EFL | Z1 | Z2 | Z3 | Z4 | f/No. |
|---|---|---|---|---|---|
| 25.5mm | .50mm | 30.83mm | 4.37mm | 17.60mm | 3.65 |
| 40.1 | 8.94 | 22.56 | 0.00 | 11.67 | 3.65 |
| 85.0 | 25.93 | 5.72 | 3.95 | 1.33 | 3.65 |
| 125.0 | 30.70 | .78 | .15 | .40 | 3.65 |

Figure 3:
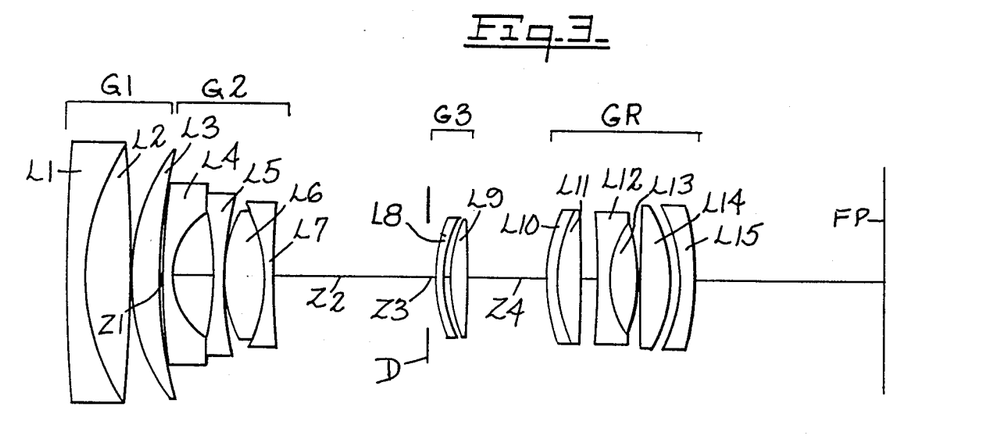
Figure 3A:
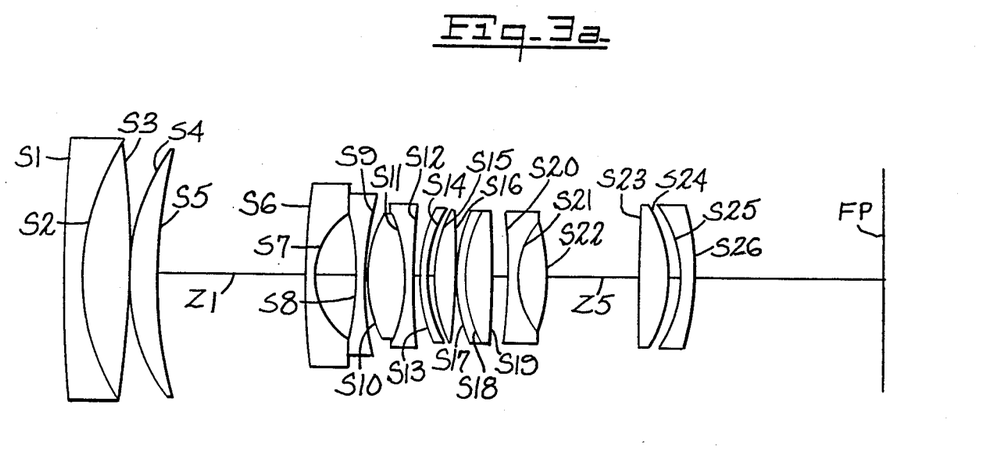

In another embodiment shown in FIGS. 3 and 3a, elements L14 and L5 of group GR remain stationary during zooming. Groups G1, G2 and G3 have the configuration shown in FIGS. 2 and 2a. Group GR comprises a first positive cemented doublet L10, L11 of bi-convex form, a second positive doublet L12, L13, a positive element L14 and a negative meniscus L15 concave to the object.

The diaphragm is stationary and arranged to maintain the relative aperture constant during variations of EFL.

This lens scaled to an image frame of 24×36 mm, and having EFL's of 25.5 to 125.0 mm, and subtending semi-field angles of 9.1 degrees to 38 degrees is substantially described in Table VIII.

TABLE VIII

| Lens | Surface | Radius Curvature (mm) | Axial Distance Between Surfaces (mm) | Nd | Vd |
|---|---|---|---|---|---|
| L1 | S1 | 445.579 | | | |
| | | | 3.50 | 1.847 | 23.8 |
| | S2 | 46.817 | | | |
| L2 | | | 9.70 | 1.806 | 40.7 |
| | S3 | −323.931 | | | |
| | | | .15 | | |
| | S4 | 44.318 | | | |
| L3 | | | 6.00 | 1.827 | 39.5 |
| | S5 | 98.638 | | | |
| | | | Z1 | | |
| | S6 | 152.122 | | | |
| L4 | | | 2.00 | 1.840 | 42.8 |
| | S7 | 16.665 | | | |
| | | | 8.40 | | |
| | S8 | −66.642 | | | |
| L5 | | | 2.00 | 1.840 | 42.8 |
| | S9 | 58.409 | | | |
| | | | .50 | | |
| | S10 | 32.864 | | | |
| L6 | | | 7.70 | 1.733 | 28.1 |
| | S11 | −30.877 | | | |
| L7 | | | 2.00 | 1.700 | 55.3 |
| | S12 | 197.121 | | | |
| | | | Z2 | | |
| Aperture | | | | | |
| | | | Z3 | | |
| | S13 | 40.025 | | | |
| L8 | | | 1.20 | 1.847 | 23.8 |
| | S14 | 24.132 | | | |
| | | | 1.30 | | |
| | S15 | 28.626 | | | |
| L9 | | | 3.30 | 1.806 | 40.7 |
| | S16 | −425.010 | | | |
| | | | Z4 | | |
| | S17 | 41.374 | | | |
| L10 | | | 2.00 | 1.854 | 23.6 |
| | S18 | 28.237 | | | |
| L11 | | | 4.50 | 1.732 | 52.0 |
| | S19 | −456.281 | | | |
| | | | 3.24 | | |
| | S20 | −209.078 | | | |
| L12 | | | 2.49 | 1.785 | 48.8 |
| | S21 | 20.252 | | | |
| L13 | | | 6.10 | 1.475 | 70.3 |
| | S22 | −38.872 | | | |
| | | | Z5 | | |
| | S23 | −1513.366 | | | |
| L14 | | | 6.10 | 1.488 | 70.4 |
| | S24 | −26.320 | | | |
| | | | 2.50 | | |
| | S25 | −24.591 | | | |
| L15 | | | 2.50 | 1.832 | 30.6 |
| | S26 | −56.837 | | | |

The spacing of the groups during zooming is set forth in Table IX.

TABLE IX

| EFL | Z1 | Z2 | Z3 | Z4 | Z5 | f/No. |
|---|---|---|---|---|---|---|
| 25.5 mm | .50 mm | 29.37 mm | 4.79 mm | .54 mm | 16.63 mm | 3.65 |
| 40.4 | 8.08 | 21.73 | .01 | 11.28 | 10.71 | 3.65 |
| 85.0 | 26.28 | 3.80 | 6.22 | 13.44 | 2.08 | 3.65 |
| 125.0 | 29.60 | .43 | .01 | 21.38 | .40 | 3.65 |

Figure 4:
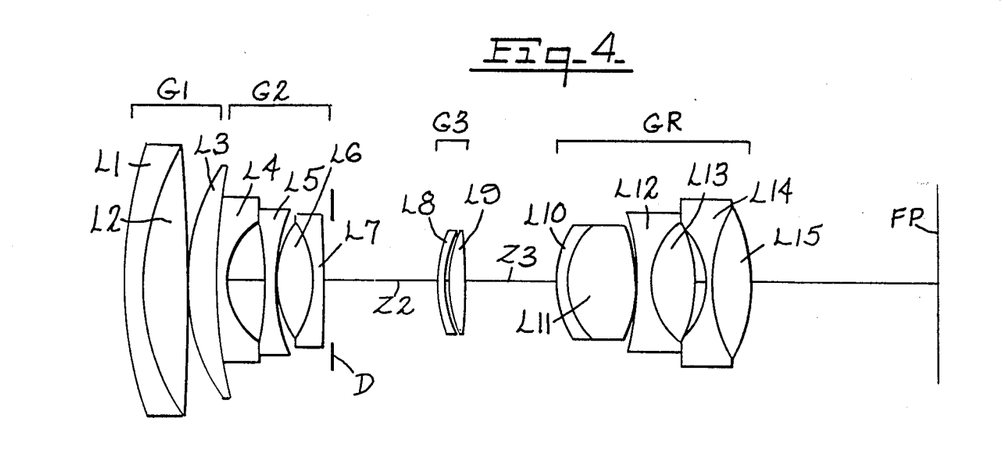
Figure 4A:
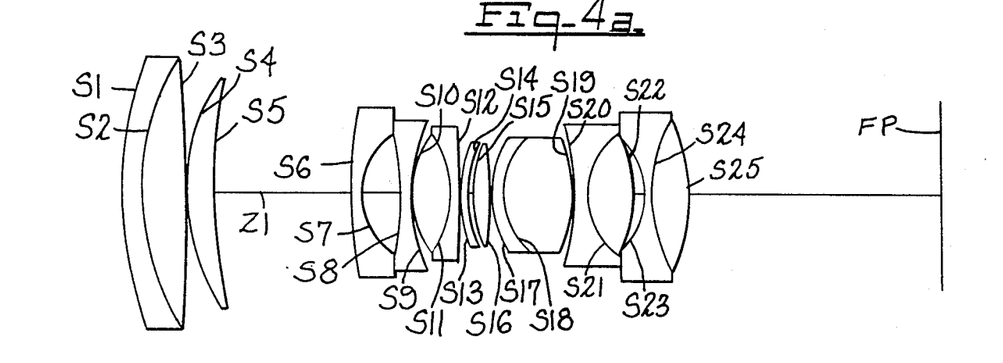

Another embodiment of the invention shown in FIGS. 4 and 4a has groups G1, G2 and G3 as previously described. Group GR comprises three positive doublets L10, L11; L12, L13; and L14, L15 which move with variation of EFL. The aperture defining diaphragm is positioned between groups G2 and G3 and is arraged to change absolute aperture with EFL to provide a constant relative aperture.

This lens as scaled for an image frame of 24×36 mm, with EFL's of 25.5 mm to 125.0 mm and subtending semi-angles of 9 degrees to 38 degrees is substantially described in Table X.

TABLE X

| Lens | Surface | Radius Curvature (mm) | Axial Distance Between Surfaces (mm) | Nd | Vd |
|---|---|---|---|---|---|
| L1 | S1 | 86.919 | | | |
|  | S2 | 51.507 | 3.50 | 1.847 | 23.8 |
| L2 | S3 | 586.863 | 9.15 | 1.569 | 63.1 |
|  | S4 | 44.013 | .15 | | |
| L3 | S5 | 120.989 | 6.00 | 1.773 | 49.6 |
|  | S6 | 107.542 | Z1 | | |
| L4 | S7 | 15.311 | 2.00 | 1.857 | 32.0 |
|  | S8 | −68.184 | 8.00 | | |
| L5 | S9 | 35.639 | 2.00 | 1.839 | 42.0 |
|  | S10 | 25.449 | .01 | | |
| L6 | S11 | −22.645 | 7.70 | 1.722 | 29.2 |
| L7 | S12 | −4941.359 | 2.00 | 1.773 | 49.6 |
|  | S13 | 42.644 | Z2 | | |
| L8 | S14 | 23.589 | 1.20 | 1.589 | 61.2 |
|  | S15 | 27.132 | .43 | | |
| L9 | S16 | 1101.577 | 3.30 | 1.655 | 33.7 |
|  | S17 | 29.676 | Z3 | | |
| L10 | S18 | 26.206 | 2.00 | 1.76 | 26.6 |
| L11 | S19 | −46.160 | 14.92 | 1.807 | 35.5 |
|  | S20 | −50.914 | .00 | | |
| L12 | S21 | 14.786 | 2.40 | 1.847 | 23.8 |
| L13 | S22 | −27.371 | 9.73 | 1.488 | 70.4 |
|  | S23 | −16.837 | 2.04 | | |
| L14 | S24 | 32.237 | 1.60 | 1.488 | 70.4 |
| L15 | S25 | −34.016 | 8.50 | 1.650 | 39.3 |

The spacing between the various groups with variation of EFL is set forth in Table XI.

TABLE XI

| EFL | Z1 | Z2 | Z3 | f/No. |
|---|---|---|---|---|
| 25.5mm | .10 | 24.34 | 19.35 | 3.65 |
| 40.0 | 7.04 | 14.78 | 11.84 | 3.65 |
| 85.0 | 26.64 | 5.97 | 1.89 | 3.65 |
| 125.0 | 28.77 | .10 | .45 | 3.65 |

Another embodiment of the invention comprises three groups G1, G2, and GR, as shown in FIGS. 5 and 5a. Groups G1 and G2 are constructed as previously described. Group GR comprises a bi-convex positive doublet L8, L9; a positive meniscus L10; a bi-concave element L11; a positive meniscus L12 concave to the object; and a positive bi-convex doublet L13, L14. In this embodiment all three groups move with change in EFL. As the EFL is increased group G1 moves toward the object end, group G2 moves toward the image end and group GR moves toward the object end. The aperture defining mechanism D is axially fixed in position.

A lens of this embodiment scaled for an image plane of 24×36 mm, EFL's of 25.5 to 104.8 mm, and subtending semi-field angles of 10.8 degrees is substantially described in Table XII.

TABLE XII

| Lens | Surface | Radius Curvature (mm) | Axial Distance Between Surfaces (mm) | Nd | Vd |
|---|---|---|---|---|---|
| L1 | S1 | 343.179 | 4.00 | 1.805 | 25.5 |
|  | S2 | 87.924 | | | |
| L2 | S3 | −412.177 | 9.5 | 1.691 | 57.7 |
|  | S4 | 72.251 | .15 | | |
| L3 | S5 | 145.982 | 4.50 | 1.804 | 46.5 |
|  | S6 | 68.558 | .Z1 | | |
| L4 | S7 | 19.481 | 2.00 | 1.834 | 37.3 |
|  | S8 | −91.032 | 8.00 | | |
| L5 | S9 | 41.216 | 2.00 | 1.834 | 37.3 |
|  | S10 | 40.739 | 4.69 | | |
| L6 | S11 | −19.592 | 7.70 | 1.762 | 26.6 |
| L7 | S12 | −689.714 | 2.00 | 1.834 | 37.3 |
|  | S13 | 35.503 | .Z2 | | |
| L8 | S14 | 22.130 | 1.50 | 1.805 | 25.5 |
| L9 | S15 | −538.122 | 6.50 | 1.713 | 53.9 |
|  | S16 | 41.920 | .15 | | |
| L10 | S17 | 526.965 | 4.00 | 1.713 | 53.9 |
|  | S18 | −37.060 | 2.70 | | |
| L11 | S19 | 47.131 | 1.50 | 1.570 | 42.6 |
|  | S20 | −103.372 | 5.29 | | |
| L12 | S21 | −26.839 | 4.00 | 1.623 | 60.1 |
|  | S22 | 60.673 | 6.33 | | |
| L13 | S23 | −18.358 | 10.00 | 1.488 | 70.4 |
| L14 | S24 | −73.946 | 1.80 | 1.834 | 37.3 |

The spacings of the various groups with variation in EFL are given in Table XIII.

TABLE XIII

| EFL | Z1 | Z2 | FVD | f/No. |
|---|---|---|---|---|
| 25.5m | .10mm | 31.93mm | 159.7mm | 3.7 |
| 40.0 | 6.64 | 16.07 | 164.5 | 3.7 |
| 85.0 | 28.06 | 2.66 | 193.6 | 3.7 |
| 105.0 | 45.2 | .39 | 204.6 | 3.7 |

The powers $K_1$, $K_2$, $K_3$ and $K_R$ of the various groups $G_1$, $G_2$, $G_3$, and $G_R$, respectively, are set forth in Table XIV:

TABLE XIV

| Lens | $K_1$ | $K_2$ | $K_3$ | $K_R$ |
|---|---|---|---|---|
| Table II | .0156 | −.0645 | .0173 | .0131 |
| Table IV | .0159 | −.0576 | .0172 | .0099 |
| Table VI | .0138 | −.0535 | .0170 | .0127 |
| Table VIII | .0143 | −.0539 | .0167 | .0119 |
| Table X | .0147 | −.0607 | .0126 | .0192 |
| Table XII | .0085 | −.0417 |  | .0260 |

The powers $K_{21}$ of the negative elements $K_{21}$ of groups $G_2$ and the power $K_{22}$ of the positive are set forth in Table XV together with the absolute ratio of the positive to the negative:

TABLE XV

| Lens | $K_{21}$ | $K_{22}$ | $K_{22}/K_{21}$ |
|---|---|---|---|
| Table II | −.0939 | .0294 | .31 |
| Table IV | −.0871 | .0287 | .33 |
| Table VI | −.0724 | .0210 | .29 |
| Table VIII | −.0718 | .0202 | .28 |
| Table X | −.0838 | .0268 | .32 |
| Table XII | −.0601 | .0166 | .27 |

The ratio of the absolute power of each group to the geometric means of the powers of the lens at the extreme EFL's is given in Table XVI.

TABLE XVI

|  | $K_1/K_M$ | $K_2/K_M$ | $K_3/K_M$ | $K_R/K_M$ |
|---|---|---|---|---|
| Table II | .88 | 3.64 | .98 | .74 |
| Table IV | .89 | 3.25 | .97 | .60 |
| Table VI | .80 | 3.02 | .96 | .72 |
| Table VIII | .81 | 3.05 | .94 | .67 |
| Table X | .83 | 3.42 | .71 | 1.08 |
| Table XII | .44 | 2.16 |  | 1.46 |

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What I claim is:

1. A lens having a range of equivalent focal lengths extending from a dimension below the diagonal of the image frame of the lens to above, comprising from the object end a first positive group, a second negative group, and a rear positive group, at least two of said groups including said negative group being axially movable to vary the equivalent focal length of said lens, said second negative group comprising from the object end first and second negative components and a positive doublet, said doublet being convex to the object side.

2. The lens of claim 1 where $1.0 > K_1/K_M > 0.4$ $4.8 > |K_2/K_M| > 2.0$ $1.5 > K_R/K_M > 0.5$ and where $K_1$, $K_2$, and $K_R$ are the optical powers of said first, second and rear groups, respectively, and $K_M$ is the geometric mean of the power of the lens at its extreme focal lengths.

3. A lens according to claim 1 where $0.20 < K_{22}/K_{21} < 0.40$ where $K_{21}$ is the absolute sum of the powers of said negative components, and $K_{22}$ is the power of said positive component.

4. A lens according to claim 1 further including a third positive group between said rear group and said second group, and an aperture defining means between said second group and said third group.

5. A lens according to claim 1 where said second group from the object end comprises a negative meniscus convex toward the object end, a bi-concave element, and said positive doublet.

6. A lens according to claim 1 where said first group and said rear group move axially in the same direction to vary the equivalent focal length of said lens, while said second group moves in the opposite direction.

7. The lens of claim 6 where said first and fourth groups move in fixed relation to one another.

8. The lens of claim 1 further including an aperture defining means behind said second group with no further elements therebetween.

9. A lens according to claim 8 where $1.0 > K_1/K_M > 0.7$ $4.8 > |K_2/K_M| > 2.0$ $1.5 > K_3/K_M > 0.6$ $1.5 > K_R/K_M > 0.5$ where $K_1$, $K_2$, $K_3$, and $K_R$ are the optical powers of said first, second, third, and rear groups, respectively, and $K_M$ is the geometric mean of the powers of the lens at the extremes of its equivalent focal lengths.

10. A lens according to claim 8 where said first group moves axially in the same direction as said rear group to vary the equivalent focal length of said lens, while said second group moves in the opposite direction.

11. A lens according to claim 10 where said first and rear groups move in fixed relation.

12. A lens according to claim 1 where $4.8 > |K_2/K_M| > 2.0$ and $0.40 > |K_{22}/K_{21}| > 0.20$ wjere $K_2$ is the power of said second group, $K_{21}$ is the sum of the power of the negative components of said second group, $K_{22}$ is the power of said positive component, and $K_M$ is the geometric mean of the powers of said lens at the extremes of its equivalent focal lengths.

13. The lens of claim 1 where said first group moves axially in the same direction as said rear group to vary the equivalent focal length of said lens, while said second group moves in the opposite direction.

14. The lens of claim 13 where said first and rear groups move in fixed relation.

15. The lens of claim 1 further including a third positive group positioned behind said second group with no other elements therebetween.

16. The lens of claim 1 where $0.4 < K_1/K_M < 1.0$ $2.0 < |K_2/K_M| < 4.8$ $0.6 < K_R/K_M < 1.0$ where $K_1$, $K_2$, and $K_R$ are the optical powers of said first, second, and rear groups, and $K_M$ is the geometric mean of the lens at the extremes of its equivalent focal lengths.

17. The lens of claim 1 where $$2.0 < |K_2/K_M| < 4.8$$

where the sum of the powers of said negative components of said second group is $K_{21}$ on the object end and said doublet has a power $K_{22}$ and $$0.2 < |K_{22}/K_{21}| < 0.4$$

where $K_M$ is the geometric mean of the powers of said lens at its extreme equivalent focal lengths.

18. A lens having a range of equivalent focal lengths extending from a dimension below the diagonal of the image frame of the lens to above, comprising from the object end a first positive group, a second negative group, a third positive group and a rear positive group, and an aperture defining means between said second and third groups, at least two of said groups being movable to vary the equivalent focal length of said lens, said second group comprising from the object end first and second negative components and a positive doublet, said doublet having a convex object side surface.

19. A zoom lens according to claim 18 scaled to an image frame of 24×36 mm and subtending semi-field angles of 9.0 degrees to 38 degrees, defined substantially as follows:

| Lens | Surface | Radius of Curvature (mm) | Axial Distance Between Surfaces (mm) | Index Refraction Nd | Abbe No. Vd |
|---|---|---|---|---|---|
| L1 | S1 | 185.9987 | | | |
|  | S2 | 49.6058 | 3.000 | 1.847 | 23.8 |
|  |  |  | 1.768 | | |
| L2 | S3 | 51.2413 | | | |
|  | S4 | −323.9418 | 11.700 | 1.743 | 49.2 |
|  |  |  | .150 | | |
| L3 | S5 | 37.4951 | | | |
|  | S6 | 70.1003 | 6.000 | 1.806 | 40.7 |
|  |  |  | Z1 | | |
| L4 | S7 | 118.4422 | | | |
|  | S8 | 13.2349 | 2.000 | 1.850 | 32.2 |
|  |  |  | 6.735 | | |
| L5 | S9 | −49.699 | | | |
|  | S10 | 42.7192 | 2.000 | 1.835 | 43.0 |
|  |  |  | Z2 | | |
|  | S11 | 24.7201 | | | |
|  | S12 | −13.4465 | 7.641 | 1.689 | 31.2 |
| L7 | S13 | −223.5334 | 2.000 | 1.713 | 53.9 |
|  |  |  | Z3 | | |
|  | Aperture |  |  | | |
|  |  |  | Z4 | | |
| L8 | S14 | 47.1016 | | | |
|  | S15 | 25.6722 | 1.500 | 1.847 | 23.8 |
|  |  |  | 1.409 | | |
| L9 | S16 | 31.4590 | | | |
|  | S17 | −100.8025 | 4.300 | 1.762 | 40.3 |
|  |  |  | .500 | | |

*-continued*

| Lens | Surface | Radius of Curvature (mm) | Axial Distance Between Surfaces (mm) | Index Refraction Nd | Abbe No. Vd |
|---|---|---|---|---|---|
|  | S18 | 40.3475 | | | |
| L10 | S19 | 25.3014 | 2.000 | 1.847 | 23.8 |
| L11 | S20 | −95.3470 | 7.000 | 1.589 | 41.0 |
|  |  |  | .150 | | |
|  | S21 | 59.5290 | | | |
| L12 | S22 | 20.2397 | 2.500 | 1.835 | 43.0 |
| L13 | S23 | −564.7725 | 6.100 | 1.488 | 70.4 |
|  |  |  | 7.154 | | |
|  | S24 | 220.4092 | | | |
| L14 | S25 | 28.9627 | 2.500 | 1.850 | 32.2 |
| L15 | S26 | −83.7917 | 6.100 | 1.488 | 70.4 | where the lens elements from object to image end are given as L1-L15 having surfaces S1-S26, $N_D$ is the index of refraction of the lens elements and $V_D$ is the dispersion of the elements measured by the Abbe number. Spaces variable with equivalent focal length are given by Z1, Z2, Z3, and Z4, and

| EFL | Z1 | Z2 | Z3 | Z4 |
|---|---|---|---|---|
| 25.5mm | 1.20mm | 20.61mm | 6.71mm | 19.73mm |
| 40.0 | 7.76 | 16.97 | .50 | 10.93 |
| 85.0 | 25.12 | 4.38 | 4.88 | .50 |
| 125.0 | 29.66 | 1.70 | .50 | .50 |

20. A zoom lens according to claim 18 scaled to an image frame of 24×36 mm and subtending semi-field angles of 9.0 degrees to 38 degrees, defined substantially as follows:

| Lens | Surface | Radius Curvature (mm) | Axial Distance Between Surfaces (mm) | Nd | Vd |
|---|---|---|---|---|---|
| L1 | S1 | 86.919 | | | |
|  | S2 | 51.507 | 3.50 | 1.847 | 23.8 |
| L2 | S3 | 586.863 | 9.15 | 1.569 | 63.1 |
|  |  |  | .15 | | |
|  | S4 | 44.013 | | | |
| L3 | S5 | 120.989 | 6.00 | 1.773 | 49.6 |
|  |  |  | Z1 | | |
|  | S6 | 107.542 | | | |
| L4 | S7 | 15.311 | 2.00 | 1.857 | 32.0 |
|  |  |  | 8.00 | | |
|  | S8 | −68.184 | | | |
| L5 | S9 | 35.639 | 2.00 | 1.839 | 42.0 |
|  |  |  | .01 | | |
|  | S10 | 25.449 | | | |
| L6 | S11 | −22.645 | 7.70 | 1.722 | 29.2 |
| L7 | S12 | −4941.359 | 2.00 | 1.773 | 49.6 |
|  |  |  | Z2 | | |
|  | S13 | 42.644 | | | |
| L8 | S14 | 23.589 | 1.20 | 1.589 | 61.2 |
|  |  |  | .43 | | |
|  | S15 | 27.132 | | | |
| L9 |  |  | 3.30 | 1.655 | 33.7 |

-continued

| Lens | Surface | Radius Curvature (mm) | Axial Distance Between Surfaces (mm) | Nd | Vd |
|---|---|---|---|---|---|
| | S16 | 1101.577 | | | |
| | | | Z3 | | |
| | S17 | 29.676 | | | |
| L10 | | | 2.00 | 1.76 | 26.6 |
| | S18 | 26.206 | | | |
| L11 | | | 14.92 | 1.807 | 35.5 |
| | S19 | −46.160 | | | |
| | | | .00 | | |
| | S20 | −50.914 | | | |
| L12 | | | 2.40 | 1.847 | 23.8 |
| | S21 | 14.786 | | | |
| L13 | | | 9.73 | 1.488 | 70.4 |
| | S22 | −27.371 | | | |
| | | | 2.04 | | |
| | S23 | −16.837 | | | |
| L14 | | | 1.60 | 1.488 | 70.4 |
| | S24 | 32.237 | | | |
| L15 | | | 8.50 | 1.650 | 39.3 |
| | S25 | −34.016 | | | | where the lens elements from object to image end are given as L1-L15 having surfaces S1-S25, $N_D$ is the index of refraction of the lens elements and $V_D$ is the dispersion of the elements measured by the Abbe number. Spaces variable with equivalent focal length are given by Z1, Z2 and Z3, and

| EFL | Z1 | Z2 | Z3 |
|---|---|---|---|
| 25.5mm | .10mm | 24.34mm | 19.35mm |
| 40.0 | 7.04 | 14.78 | 11.84 |
| 85.0 | 26.64 | 5.97 | 1.89 |
| 125.0 | 28.77 | .10 | .45 |

21. A zoom lens according to claim 18 scaled to an image frame of 24×36 mm and subtending semi-field angles of 9.0 degrees to 38 degrees, defined substantially as follows:

| Lens | Surface | Radius Curvature (mm) | Axial Distance Between Surfaces (mm) | Nd | Vd |
|---|---|---|---|---|---|
| | S1 | 445.579 | | | |
| L1 | | | 3.50 | 1.847 | 23.8 |
| | S2 | 46.817 | | | |
| L2 | | | 9.70 | 1.806 | 40.7 |
| | S3 | −323.931 | | | |
| | | | .15 | | |
| | S4 | 44.318 | | | |
| L3 | | | 6.00 | 1.827 | 39.5 |
| | S5 | 98.638 | | | |
| | | | Z1 | | |
| | S6 | 152.122 | | | |
| L4 | | | 2.00 | 1.840 | 42.8 |
| | S7 | 16.665 | | | |
| | | | 8.40 | | |
| | S8 | −66.642 | | | |
| L5 | | | 2.00 | 1.840 | 42.8 |
| | S9 | 58.409 | | | |
| | | | .50 | | |
| | S10 | 32.864 | | | |
| L6 | | | 7.70 | 1.733 | 28.1 |
| | S11 | −30.877 | | | |
| L7 | | | 2.00 | 1.700 | 55.3 |
| | S12 | 197.121 | | | |
| | | | Z2 | | |
| Aperture | | | | | |
| | | | Z3 | | |
| | S13 | 40.025 | | | |
| L8 | | | 1.20 | 1.847 | 23.8 |
| | S14 | 24.132 | | | |
| | | | 1.30 | | |

-continued

| Lens | Surface | Radius Curvature (mm) | Axial Distance Between Surfaces (mm) | Nd | Vd |
|---|---|---|---|---|---|
| | S15 | 28.626 | | | |
| L9 | | | 3.30 | 1.806 | 40.7 |
| | S16 | −425.010 | | | |
| | | | Z4 | | |
| | S17 | 41.374 | | | |
| L10 | | | 2.00 | 1.854 | 23.6 |
| | S18 | 28.237 | | | |
| L11 | | | 4.50 | 1.732 | 52.0 |
| | S19 | −456.281 | | | |
| | | | 3.24 | | |
| | S20 | −209.078 | | | |
| L12 | | | 2.49 | 1.785 | 48.8 |
| | S21 | 20.252 | | | |
| L13 | | | 6.10 | 1.475 | 70.3 |
| | S22 | −38.872 | | | |
| | | | Z5 | | |
| | S23 | −1513.366 | | | |
| L14 | | | 6.10 | 1.488 | 70.4 |
| | S24 | −26.320 | | | |
| | | | 2.50 | | |
| | S25 | −24.591 | | | |
| L15 | | | 2.50 | 1.832 | 30.6 |
| | S26 | −56.837 | | | | where the lens elements from object to image end are given as L1-L15 having surfaces S1-S26, $N_D$ is the index of refraction of the lens elements and $V_D$ is the dispersion of the elements measured by the Abbe number. Spaces variable with equivalent focal lengths are given by Z1, Z2, Z3, Z4 and Z5, and

| EFL | Z1 | Z2 | Z3 | Z4 | Z5 |
|---|---|---|---|---|---|
| 25.5mm | .50mm | 29.37mm | 4.79mm | .54mm | 16.63mm |
| 40.4 | 8.08 | 21.73 | .01 | 11.28 | 10.71 |
| 85.0 | 26.28 | 3.80 | 6.22 | 13.44 | 2.08 |
| 125.0 | 29.60 | .43 | .01 | 21.38 | .40 |

22. A zoom lens according to claim 18 scaled to an image frame of 24×36 mm and subtending semi-field angles of 9.0 degrees to 38 degrees, defined substantially as follows:

| Lens | Surface | Radius Curvature (mm) | Axial Distance Between Surfaces (mm) | Nd | Vd |
|---|---|---|---|---|---|
| | S1 | 272.365 | | | |
| L1 | | | 3.50 | 1.762 | 27.3 |
| | S2 | 49.902 | | | |
| L2 | | | 9.70 | 1.673 | 51.4 |
| | S3 | −348.735 | | | |
| | | | .15 | | |
| | S4 | 41.575 | | | |
| L3 | | | 6.00 | 1.806 | 40.7 |
| | S5 | 88.688 | | | |
| | | | Z1 | | |
| | S6 | 119.038 | | | |
| L4 | | | 2.00 | 1.857 | 32.0 |
| | S7 | 15.309 | | | |
| | | | 8.40 | | |
| | S8 | −59.323 | | | |
| L5 | | | 2.00 | 1.840 | 42.8 |
| | S9 | 85.381 | | | |
| | | | .07 | | |
| | S10 | 31.319 | | | |
| L6 | | | 7.70 | 1.762 | 27.3 |
| | S11 | −25.034 | | | |
| L7 | | | 2.00 | 1.697 | 55.5 |
| | S12 | 110.053 | | | |
| | | | Z2 | | |
| Aperture | | | | | |
| | | | Z3 | | |

-continued

| Lens | Surface | Radius Curvature (mm) | Axial Distance Between Surfaces (mm) | Nd | Vd |
|---|---|---|---|---|---|
| L8 | S13 | 54.083 | | | |
| | | | 1.20 | 1.847 | 23.8 |
| | S14 | 27.576 | | | |
| | | | .43 | | |
| L9 | S15 | 29.890 | | | |
| | | | 3.30 | 1.806 | 40.7 |
| | S16 | −163.620 | | | |
| | | | Z4 | | |
| L10 | S17 | 47.088 | | | |
| | | | 2.00 | 1.847 | 23.8 |
| | S18 | 20.204 | | | |
| L11 | | | 4.50 | 1.650 | 39.3 |
| | S19 | −192.570 | | | |
| | | | 14.66 | | |
| | S20 | 253.894 | | | |
| L12 | | | 2.49 | 1.790 | 43.7 |
| | S21 | 25.299 | | | |
| L13 | | | 6.10 | 1.488 | 70.4 |
| | S22 | −47.350 | | | | where the lens elements from object to image end are given as L1–L13 having surfaces S1–S22, $N_D$ is the index of refraction of the lens elements and $V_D$ is the dispersion of the elements measured by the Abbe number. Spaces variable with equivalent focal length are given by Z1, Z2, Z3, and Z4, and

| EFL | Z1 | Z2 | Z3 | Z4 |
|---|---|---|---|---|
| 25.5mm | .50mm | 30.83mm | 4.37mm | 17.60mm |
| 40.1 | 8.94 | 22.56 | 0.00 | 11.67 |
| 85.0mm | 25.93 | .572 | 3.953.95 | 1.33 |
| 125.0 | 30.70 | .78 | .15 | .40 |

23. A zoom lens according to claim 18 scaled to an image frame of 24×36 mm and subtending semi-field angles of 9.0 degrees to 38 degrees, defined substantially as follows:

| Lens | Surface | Radius of Curvature (mm) | Axial Distance Between Surfaces (mm) | Nd | Vd |
|---|---|---|---|---|---|
| L1 | S1 | 414.835 | | | |
| | | | 3.500 | 1.847 | 23.8 |
| | S2 | 50.369 | | | |
| | | | 1.768 | | |
| L2 | S3 | 52.721 | | | |
| | | | 11.700 | 1.743 | 49.2 |
| | S4 | −203.797 | | | |
| | | | .150 | | |
| L3 | S5 | 41.688 | | | |
| | | | 6.00 | 1.806 | 40.7 |
| | S6 | 103.130 | | | |
| | | | Z1 | | |
| L4 | S7 | 302.316 | | | |
| | | | 2.00 | 1.850 | 32.2 |
| | S8 | 14.793 | | | |
| | | | 8.400 | | |
| L5 | S9 | −64.865 | | | |
| | | | 2.000 | 1.840 | 42.8 |
| | S10 | 44.117 | | | |
| | | | .100 | | |
| L6 | S11 | 28.093 | | | |
| | | | 7.700 | 1.739 | 28.3 |
| | S12 | −19.503 | | | |
| L7 | | | 2.000 | 1.651 | 59.0 |
| | S13 | 349.480 | | | |
| | | | Z2 | | |
| | Aperture | | | | |
| | | | Z3 | | |
| L8 | S14 | 42.981 | | | |
| | | | 1.200 | 1.847 | 23.8 |

-continued

| Lens | Surface | Radius of Curvature (mm) | Axial Distance Between Surfaces (mm) | Nd | Vd |
|---|---|---|---|---|---|
| | S15 | 26.354 | | | |
| | | | 1.858 | | |
| | S16 | 31.399 | | | |
| L9 | | | 3.300 | 1.790 | 41.4 |
| | S17 | −199.096 | | | |
| | | | Z4 | | |
| L10 | S18 | 28.676 | | | |
| | | | 2.000 | 1.862 | 23.3 |
| | S19 | 20.560 | | | |
| L11 | | | 4.500 | 1.547 | 27.8 |
| | S20 | −128.190 | | | |
| | | | 8.039 | | |
| | S21 | 70.468 | | | |
| L12 | | | 2.500 | 1.619 | 20.3 |
| | S22 | 25.194 | | | |
| L13 | | | 6.100 | 1.488 | 70.3 |
| | S23 | −132.809 | | | |
| | | | 1.984 | | |
| | S24 | 2798.444 | | | |
| L14 | | | 2.500 | 1.863 | 37.4 |
| | S25 | 21.735 | | | |
| L15 | | | 6.100 | 1.482 | 71.2 |
| | S26 | −70.988 | | | | where the lens elements from object to image end are given as L1–L15 having surfaces S1–S26, $N_D$ is the index of refraction of the lens elements and $V_D$ is the dispersion of the elements measured by the Abbe number. Spaces variable with equivalent focal length are given by Z1, Z2, Z3, and Z4, and

| EFL | Z1 | Z2 | Z3 | Z4 |
|---|---|---|---|---|
| 25.5mm | 1.21mm | 29.85mm | 3.63mm | 13.92mm |
| 40.0 | 8.70 | 22.03 | .50 | 6.60 |
| 85.0 | 26.4 | 4.89 | 6.98 | .03 |
| 125.0 | 29.6 | 1.70 | .50 | .50 |

24. A lens according to claim 18 scaled to an image frame of 24×36 mm and subtending semi-field angles of 10.8 degrees to 38 degrees, defined substantially as follows:

| Lens | Surface | Radius Curvature (mm) | Axial Distance Between Surfaces (mm) | Nd | Vd |
|---|---|---|---|---|---|
| L1 | S1 | 343.179 | | | |
| | | | 4.00 | 1.805 | 25.5 |
| | S2 | 87.924 | | | |
| L2 | | | 9.5 | 1.691 | 57.7 |
| | S3 | −412.177 | | | |
| | | | .15 | | |
| | S4 | 72.251 | | | |
| L3 | | | 4.50 | 1.804 | 46.5 |
| | S5 | 145.982 | | | |
| | | | Z1 | | |
| | S6 | 68.558 | | | |
| L4 | | | 2.00 | 1.834 | 37.3 |
| | S7 | 19.481 | | | |
| | | | 8.00 | | |
| | S8 | −91.032 | | | |
| L5 | | | 2.00 | 1.834 | 37.3 |
| | S9 | 41.216 | | | |
| | | | 4.69 | | |
| | S10 | 40.739 | | | |
| L6 | | | 7.70 | 1.762 | 26.6 |
| | S11 | −19.592 | | | |
| L7 | | | 2.00 | 1.834 | 37.3 |
| | S12 | −689.714 | | | |
| | | | Z2 | | |
| | S13 | 35.503 | | | |
| L8 | | | 1.50 | 1.805 | 25.5 |

-continued

| Lens | Surface | Radius Curvature (mm) | Axial Distance Between Surfaces (mm) | Nd | Vd |
|---|---|---|---|---|---|
| | S14 | 22.130 | | | |
| L9 | | | 6.50 | 1.713 | 53.9 |
| | S15 | −538.122 | | | |
| | | | .15 | | |
| | S16 | 41.920 | | | |
| L10 | | | 4.00 | 1.713 | 53.9 |
| | S17 | 526.965 | | | |
| | | | 2.70 | | |
| | S18 | −37.060 | | | |
| L11 | | | 1.50 | 1.570 | 42.6 |
| | S19 | 47.131 | | | |
| | | | 5.29 | | |
| | S20 | −103.372 | | | |
| L12 | | | 4.00 | 1.623 | 60.1 |
| | S21 | −26.839 | | | |
| | | | 6.33 | | |
| | S22 | 60.673 | | | |
| L13 | | | 10.00 | 1.488 | 70.4 |
| | S23 | −18.358 | | | |
| L14 | | | 1.80 | 1.834 | 37.3 |
| | S24 | −73.946 | | | | where the lens elements from object to image end are given as L1–L14 having surfaces S1–S24, $N_D$ is the index of refraction of the lens elements and $V_D$ is the dispersion of the elements measured by the Abbe number. Spaces variable with equivalent focal length are given by Z1 and Z2, and

| EFL | Z1 | Z2 |
|---|---|---|
| 25.5mm | .10mm | 31.93mm |
| 40.0 | 6.64 | 16.07 |
| 85.0 | 28.06 | 2.66 |
| 105.0 | 45.2 | .39 |

25. A lens according to claim 18 where said second group from the object end comprises a negative meniscus convex toward the object end, a bi-concave component, and said positive doublet.

26. A lens according to claim 25 where $$0.40 > |K_{22}/K_{21}| > 0.20$$

where $K_{21}$ is the sum of the powers of said meniscus and bi-concave component, and $K_{22}$ is the power of the positive doublet.

27. A lens having a range of equivalent focal lengths extending from a dimension below the diagonal of the image frame of the lens to above comprising from the object end a first positive group, a second negative group, and a rear positive group, at least two of said groups being movable to vary the equivalent focal ength of said lens, an aperture defining mechanism positioned behind said second group with no optical power therebetween, said second group comprising from the object end first and second negative components and a positive doublet, said doublet having a convex object side surface.

28. The lens of claim 27 further including a third positive group between said rear group and said second group, and an aperture defining means between said second group and said third group.

29. The lens of claim 27 where said second group from the object end comprises a negative meniscus convex toward the object end, a bi-concave component, and said positive doublet.

30. The lens of claim 27 where said first group moves axially in the same direction as said rear group to vary the equivalent focal length of said lens, while said third group moves in the opposite direction.

31. The lens of claim 30 where said first and fourth groups move in fixed relation.

32. The lens of claim 28 where $$0.4 < K_1/K_M < 1.0$$

$$2.0 < |K_2/K_M| < 4.8$$

$$0.6 < K_R/K_M < 1.0$$

where $K_1$, $K_2$ and $K_R$ are the optical powers of said first, second, and rear groups, and $K_M$ is the geometric mean of the lens at the extremes of its focal length range.

33. The lens of claim 31 where $$0.7 < K_1/K_M < 1.0$$

$$2.0 < |K_2/K_M| < 4.8$$

$$0.6 < K_3/K_M < 1.5$$

$$0.5 < K_R/K_M < 1.5$$

where $K_1$, $K_2$, $K_3$ and $K_R$ are the optical powers of said first, second and rear groups, $K_M$ is the geometric mean of the lens at the extremes of its focal length range.

34. A lens having a range of equivalent lengths extending from a dimension below the diagonal of the image frame to above, said lens from the object end consisting of a first positive group, a second negative group including a doublet convex to the object end, and a third positive group, at least two of said groups including said negative group being axially movable to vary the equivalent focal length of said lens, first, second, and third groups having powers $K_1$, $K_2$, and $K_R$ respectively, and $$1.0 > K_1/K_M > 0.4$$

$$4.8 > K_2/K_M > 2.0$$

$$1.5 > K_2/K_R > 0.5$$

where $K_M$ is the geometric mean of the powers of the lens at its extreme equivalent focal lengths.

35. A lens having a range of equivalent lengths extending from a dimension below the diagonal of the image frame to above said lens from the object and consisting of a first positive group, a second negative group including a doublet convex to the object end, a third positive group, and a fourth positive group at least two of said groups including said negative group being axially movable to vary the equivalent focal length of said lens, first, second, third, and fourth groups having powers $K_1$, $K_2$, $K_3$ and $K_R$ respectively, and $$1.0 > K_1/K_M > 0.7$$

$$4.8 > K_2/K_M > 2.0$$

$$1.5 > K_3/K_M > 0.6$$

$$1.5 > K_R/K_M > 0.5$$

where $K_M$ is the geometric mean of the powers of the lens at its extreme equivalent focal lengths.

* * * * *

UNITED STATES PATENT AND TRADEMARK OFFICE
CERTIFICATE OF CORRECTION

PATENT NO. : 4,299,454
DATED : November 10, 1981
INVENTOR(S) : Ellis I. Betensky It is certified that error appears in the above-identified patent and that said Letters Patent are hereby corrected as shown below:

Column 1, Line 44: "opticl" should read -- optical --.

Column 4, Line 29: "Table VII" should read -- Table VIII --.

Column 5, in Table II, under heading of "Axial Distance Between Surfaces": Delete bracketed items "[Z2] ]Z3] [Z4] [.500]".

Column 9, Line 3: Change "arraged" to -- arranged --.

Column 12, Line 49, 1st word: Change "wjere" to -- where --

IN THE CLAIMS

Column 19, Claim 27, Line 55, 1st word: Change "ength" to -- length --

Signed and Sealed this

Sixth Day of April 1982

|SEAL|

Attest:

GERALD J. MOSSINGHOFF

Attesting Officer     Commissioner of Patents and Trademarks